US012687938B2

(12) United States Patent
Ninomiya et al.

(10) Patent No.: US 12,687,938 B2
(45) Date of Patent: Jul. 21, 2026

(54) ELECTRONIC PEN AND ELECTRONIC PEN CORE BODY

(71) Applicant: Wacom Co., Ltd., Saitama (JP)

(72) Inventors: Kenichi Ninomiya, Saitama (JP);
Mamoru Ogata, Saitama (JP);
Masayuki Maeda, Saitama (JP);
Takayuki Arai, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/003,993

(22) Filed: Dec. 27, 2024

(65) Prior Publication Data

US 2025/0138652 A1 May 1, 2025

Related U.S. Application Data

(63) Continuation of application No. PCT/JP2023/017913, filed on May 12, 2023.

(30) Foreign Application Priority Data

Jul. 1, 2022 (JP) ................................. 2022-106772

(51) Int. Cl.
*G06F 3/0354* (2013.01)
*B43K 1/12* (2006.01)
(52) U.S. Cl.
CPC ............ *G06F 3/03545* (2013.01); *B43K 1/12* (2013.01)
(58) Field of Classification Search
CPC ........ G06F 3/03545; G06F 3/03; G06F 3/046; B43K 1/12
See application file for complete search history.

(56) References Cited

U.S. PATENT DOCUMENTS

2013/0321355 A1* 12/2013 Teiblum .............. G06F 3/03545
345/179
2016/0188016 A1* 6/2016 Munakata ........... G06F 3/04162
345/179

(Continued)

FOREIGN PATENT DOCUMENTS

JP H0816300 A * 1/1996
JP 2010020406 A 1/2010

(Continued)

OTHER PUBLICATIONS

English Translation of International Search Report dated Jul. 11, 2023, for the corresponding International Patent Application No. PCT/JP2023/017913, 3 pages.

*Primary Examiner* — Temesghen Ghebretinsae
*Assistant Examiner* — Ivelisse Martinez Quiles
(74) *Attorney, Agent, or Firm* — Seed Intellectual Property Law Group LLP

(57) ABSTRACT

Provided is an electronic pen including a housing having an opening portion on a pen tip side of the housing on a first end in an axial direction, the opening portion having a pillar-shaped space with a predetermined length in the axial direction as a center line direction of the space, the housing including, inside, a hollow portion communicating with the pillar-shaped space of the opening portion, a pen pressure detector arranged in the hollow portion, and a core body including a tip portion on the first end in the axial direction, part of the tip portion protruding outside of the housing from an opening on a pen tip side of the pillar-shaped space of the opening portion of the housing, the core body being installed such that a second end in the axial direction, in operation, transmits, to the pen pressure detector, pen pressure applied to the tip portion.

16 Claims, 5 Drawing Sheets

(56) References Cited

U.S. PATENT DOCUMENTS

| 2018/0164908 A1 * | 6/2018 | Tanaka ................... G06F 3/0383 |
| 2022/0050536 A1 * | 2/2022 | Kamiyama ......... G06F 3/03546 |
| 2022/0350428 A1 * | 11/2022 | Sato ....................... B43K 19/00 |

FOREIGN PATENT DOCUMENTS

| JP | 2011186803 A | | 9/2011 | |
| JP | 2012108896 A | | 6/2012 | |
| JP | 2013161307 A | | 8/2013 | |
| JP | 2014021674 A | | 2/2014 | |
| JP | 2016126503 A | | 7/2016 | |
| JP | 2021093040 A | * | 6/2021 | |
| WO | 2016185915 A1 | | 11/2016 | |
| WO | WO-2021157517 A1 | * | 8/2021 | ......... G06F 3/03545 |

* cited by examiner

FIG. 1

FIG. 2A
FIG. 2B
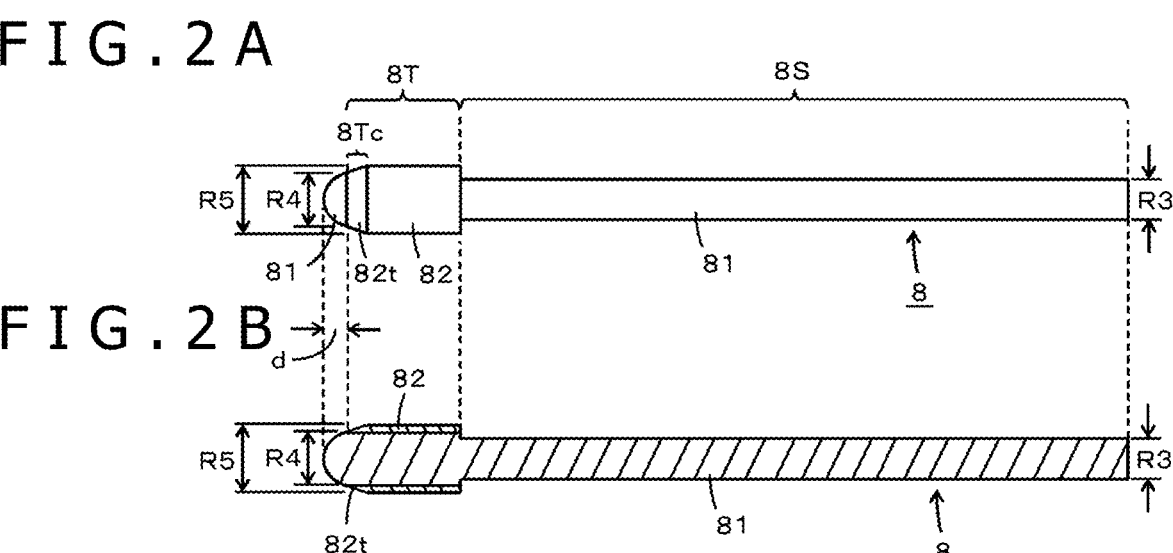
FIG. 3A
FIG. 3B
FIG. 3C
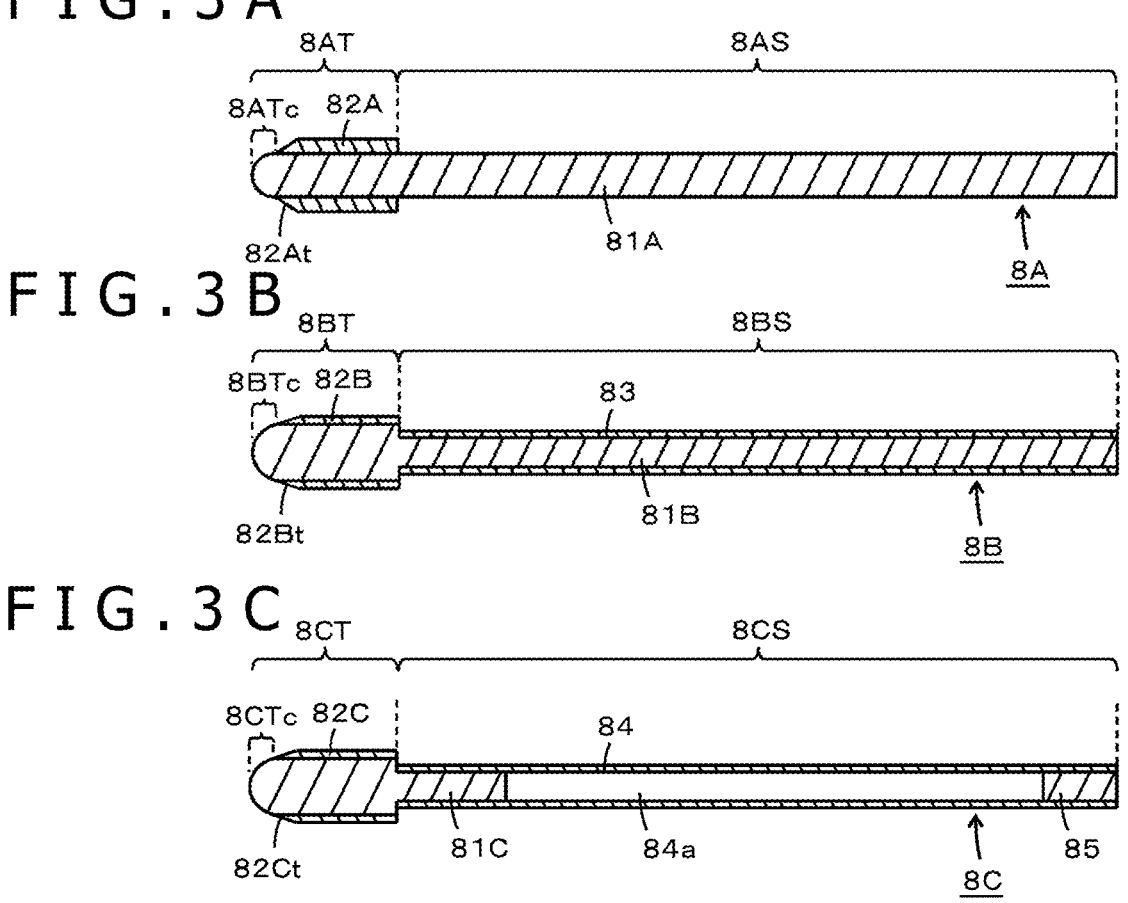

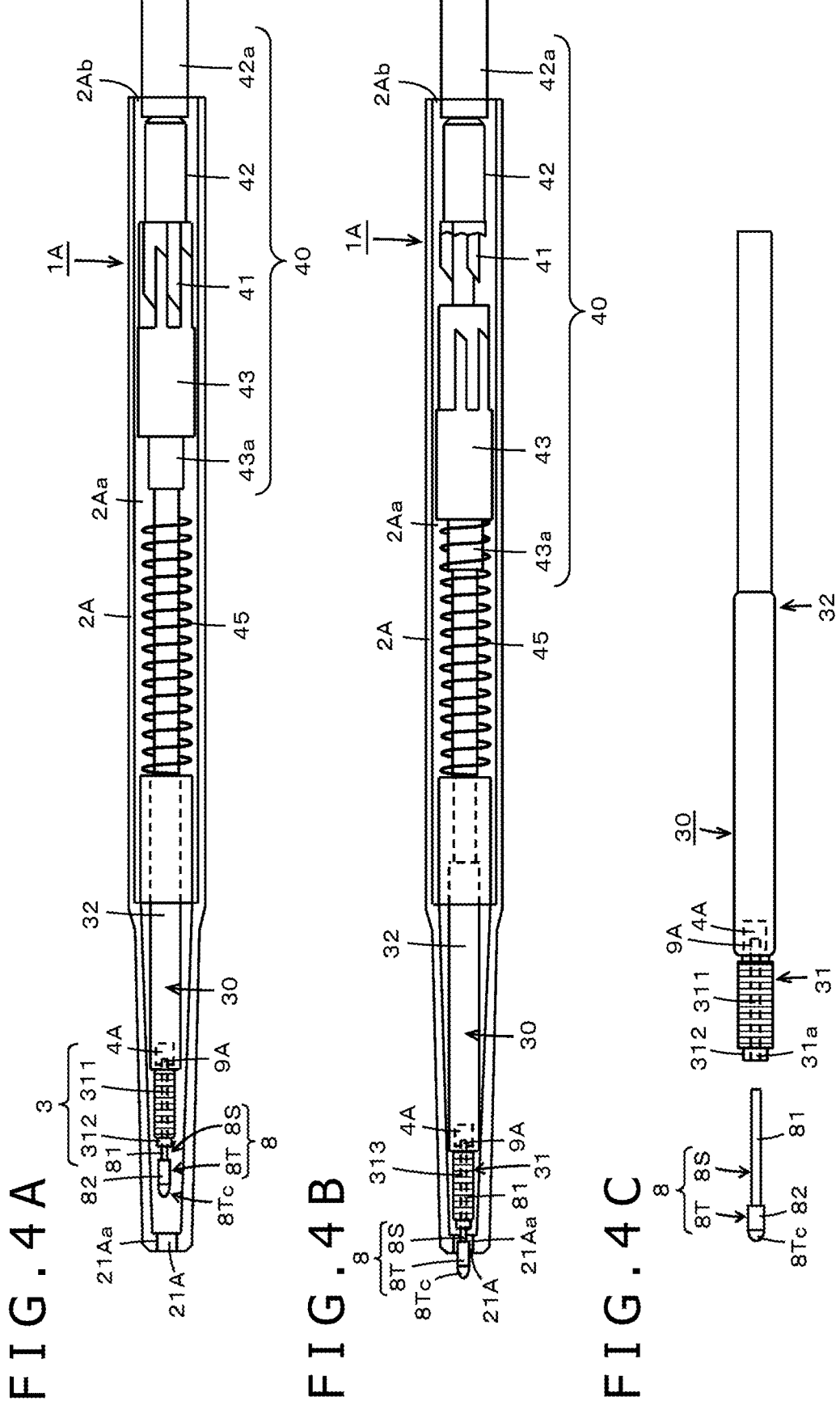
F I G. 4 A
F I G. 4 B
F I G. 4 C

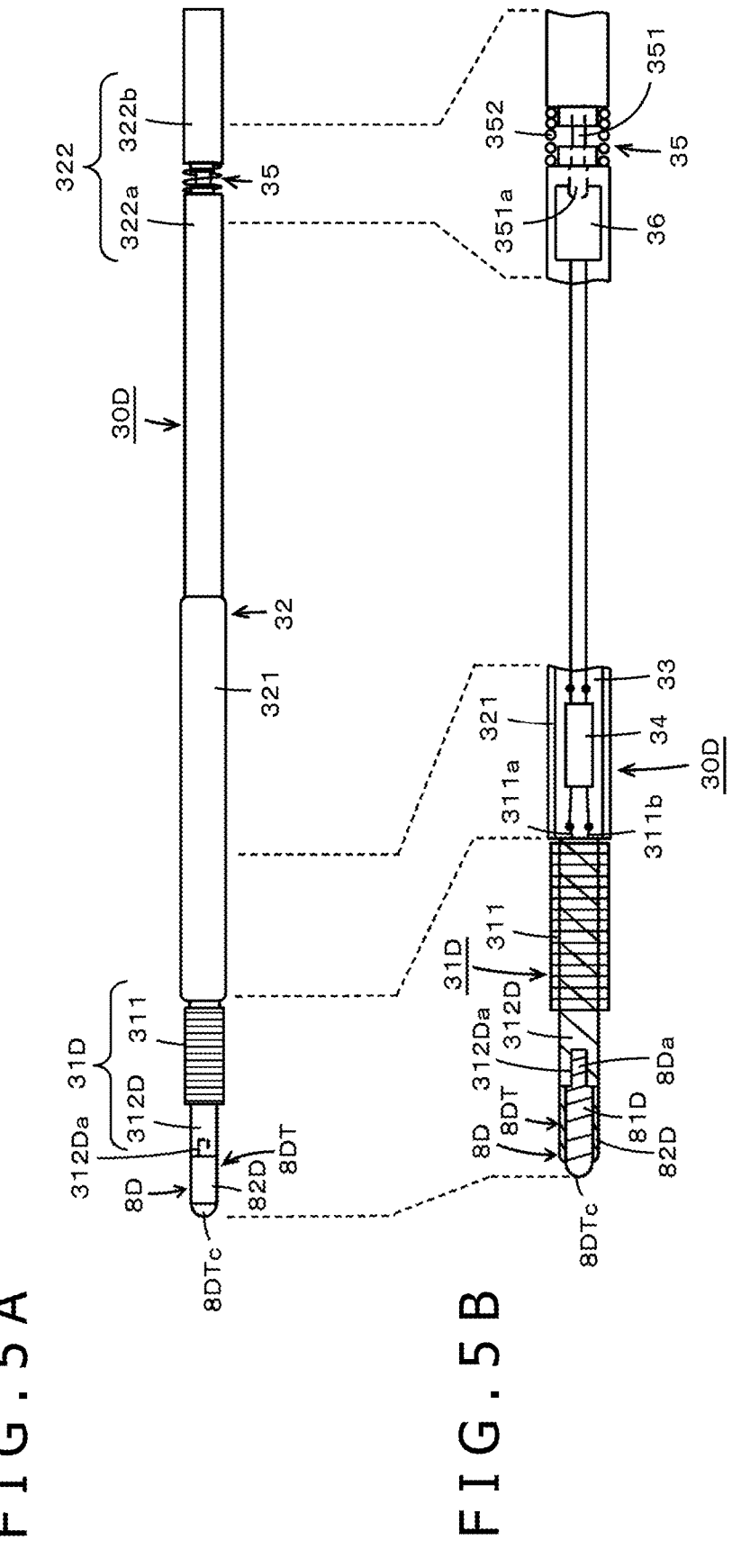
F I G . 5 A
F I G . 5 B

ELECTRONIC PEN AND ELECTRONIC PEN CORE BODY

BACKGROUND

Technical Field

The disclosure relates to an electronic pen and an electronic pen core body.

Description of the Related Art

A user moves an electronic pen while a tip portion of a core body protruding from an opening on a pen tip side of a housing of the electronic pen is in contact with an input surface of a position detection sensor. The position detection sensor detects a movement trajectory of a contact portion of the electronic pen as a writing trajectory of the electronic pen.

The friction between the input surface and the contact portion is an important factor for the feel of writing of the electronic pen on the input surface. Not only the surface characteristics of the input surface, but also the material of the core body coming into contact with the input surface is heavily involved in the feel of writing. Therefore, various materials are conventionally used for the core bodies of electronic pens.

The feel of writing, on the input surface, of the electronic pen containing fibers, such as felt, bundled in the axial direction among the materials of the core bodies of these types of electronic pens is similar to the feel of writing obtained when the user uses a pencil to take a note on paper. Therefore, the demand for the core body of the electronic pen containing felt is increasing. However, there is a problem that the strength of the conventional felt is a little weak.

Therefore, various proposals for using felt in the core body of the electronic pen have conventionally been made, and the weakness in the strength of the conventional felt is taken into account in the proposals. For example, a core body containing felt attached to a tip portion made of a hard resin, such as Polyoxymethylene (POM), is disclosed in Japanese Patent Laid-Open No. 2014-21674 (referred to as Patent Document 1). A core body containing felt provided on a tip of a pipe portion including a hard member, such as metal, is proposed in Domestic Re-publication of PCT International Publication for Patent Application No. 2016/185915 (referred to as Patent Document 2).

According to the core bodies of Patent Document 1 and Patent Document 2, the felt is attached to the tip portion of the core body, and the axial portion of the core body contains a hard material. Therefore, a core body overcoming the weakness in the strength of the felt can be provided.

However, fibers are bundled and bonded in the axial direction to obtain the felt, and there is a problem that what is generally called fluffing occurs when, for example, the felt is rubbed. More specifically, the tip portion of the core body protrudes outside from the opening of the housing, and force in a direction crossing the axial direction is applied to the core body when the user tilts the electronic pen and brings the electronic pen into contact with the input surface of the position detection sensor. As a result, the axis of the core body may be shifted due to the gap between the tip portion of the core body and the end surface of the opening of the housing.

Therefore, when the tip portion of the core body contains fibers, such as felt, bundled in the axial direction, the end surface of the opening of the housing and the tip portion of the core body may be rubbed, and fluffing may occur. If the fluffing occurs, the tip portion of the core body is expanded, and this increases the area of the contact point of the tip portion of the core body and the input surface of the position detection sensor. It becomes difficult to precisely input the indicated position, and the usability of the electronic pen becomes poor.

In addition, when the electronic pen includes a pen pressure detector that detects the pen pressure applied to the tip portion of the core body, the fluffing of the tip portion of the core body increases the friction between the end surface of the opening of the housing and the core body, and the pen pressure may not be accurately detected.

BRIEF SUMMARY

Embodiments of the disclosure provide an electronic pen that can solve the problems.

To solve the problems, provided is an electronic pen including a housing including an opening portion on a pen tip side of the housing on a first end in an axial direction of the housing, wherein the opening portion has a pillar-shaped space with a predetermined length in the axial direction of the housing, wherein the axial direction of the housing is a center line direction of the pillar-shaped space, and wherein a hollow portion inside of the housing communicates with the pillar-shaped space of the opening portion, a pen pressure detector arranged in the hollow portion of the housing, and a core body including a tip portion on the first end side in the axial direction of the housing, wherein part of the tip portion, in operation, protrudes outside of the housing from an opening on the pen tip side of the pillar-shaped space of the opening portion of the housing, wherein the core body is installed such that a second end in the axial direction of the housing, in operation, transmits, to the pen pressure detector arranged in the hollow portion of the housing, pen pressure applied to the tip portion, wherein the tip portion of the core body contains fibers bundled in the axial direction of the housing, wherein the fibers bundled in the axial direction of the housing are exposed at a contact portion that comes into contact with an input surface of a position detection sensor, and wherein at least part of the tip portion that faces an inner circumferential wall surface of the opening portion on the pen tip side of the housing is covered by a material harder than the fibers bundled in the axial direction of the housing.

In the electronic pen with the configuration described above, the core body includes the tip portion partially protruding outside from the opening portion on the pen tip side, the tip portion including a part configured to face the inner circumferential wall surface of the opening portion on the pen tip side of the housing. The tip portion contains the fibers bundled in the axial direction of the housing, and the fibers bundled in the axial direction of the housing are exposed at the contact portion that comes into contact with the input surface of the position detection sensor. At least part of the tip portion configured to face the inner circumferential wall surface of the opening portion on the pen tip side of the housing is covered by a material harder than the fibers bundled in the axial direction of the housing.

According to the configuration, the fiber felt bundled in the axial direction of the housing is exposed at the contact portion of the tip portion of the core body that comes into contact with the input surface of the position detection sensor. Therefore, an electronic pen can be provided, in which the feel of writing is obtained by the fiber felt bundled in the axial direction of the housing. The electronic pen can also prevent rubbing between the fibers bundled in the axial direction of the tip portion of the core body and the inner circumferential wall of the opening portion on the pen tip side of the housing and can reduce fluffing of the tip portion of the core body.

BRIEF DESCRIPTION OF THE SEVERAL VIEWS OF THE DRAWINGS

FIG. 1 is a diagram for describing a configuration example of an embodiment of an electronic pen according to the disclosure;

FIGS. 2A and 2B are diagrams for describing a configuration example of an embodiment of an electronic pen core body according to the disclosure;

FIGS. 3A to 3C are diagrams for describing a configuration example of another embodiment of the electronic pen core body according to the disclosure;

FIGS. 4A to 4C are diagrams for describing a configuration example of a first other embodiment of the electronic pen according to the disclosure;

FIGS. 5A and 5B are diagrams for describing another configuration example of the first other embodiment of the electronic pen according to the disclosure;

DETAILED DESCRIPTION

Figure 1:
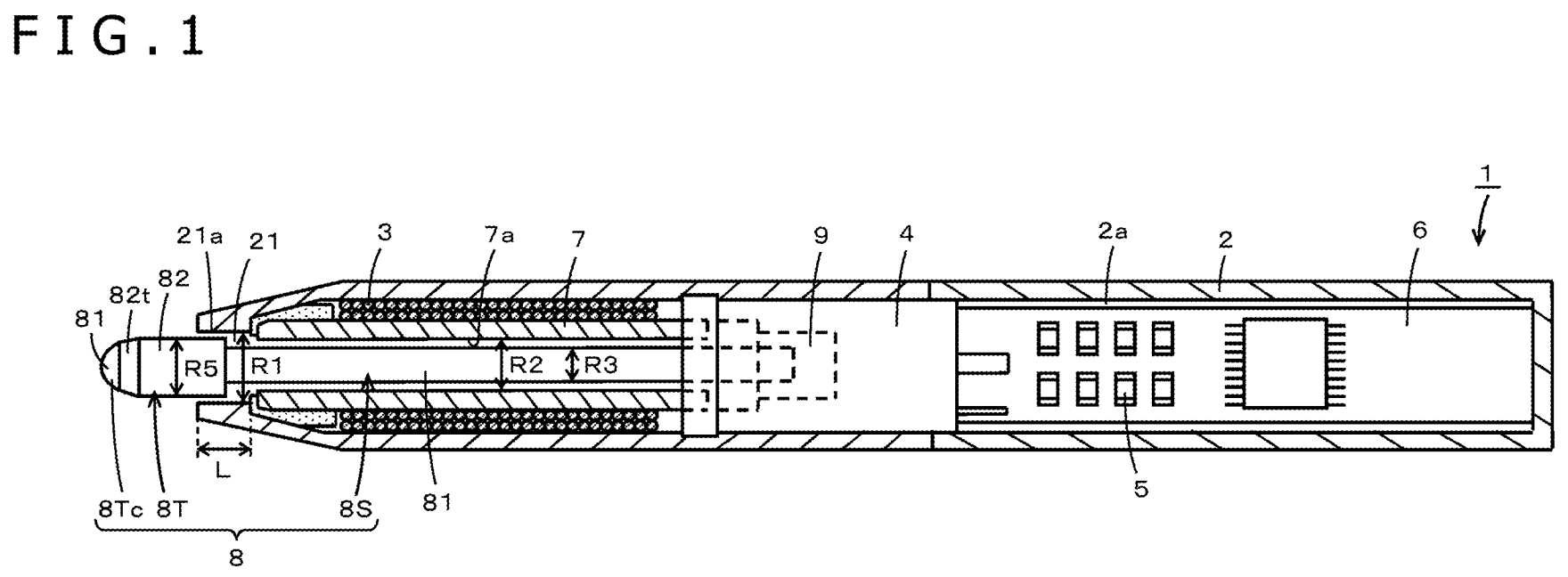
Figure 6:
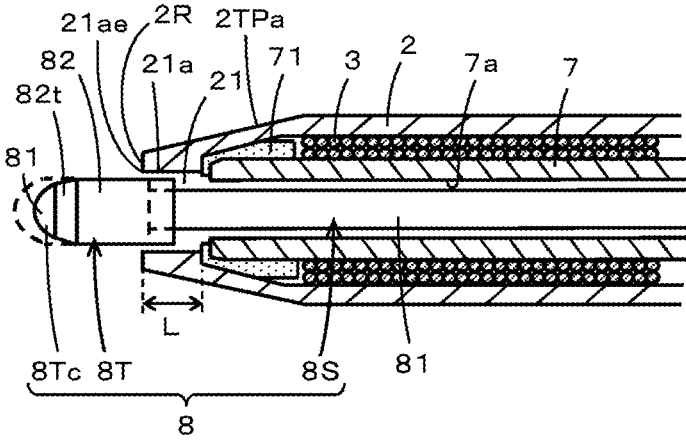
FIG. 6 depicts a comparative example for describing a configuration example of a second another embodiment of the electronic pen according to the disclosure.

An embodiment of an electronic pen according to the disclosure will be described along with an embodiment of an electronic pen core body with reference to the drawings.
Embodiment of Electronic Pen FIG. 1 illustrates a configuration example of an electronic pen 1 of the embodiment, and this example illustrates a case of an electronic pen of electromagnetic resonance system. The electronic pen 1 of the embodiment includes a housing 2 in a tubular shape, which is a cylindrical shape in the example. One end side of the housing 2 in an axial direction is a pen tip side gradually becoming narrower, and an opening portion 21 is provided. Another end side (referred to as a back end side) of the housing 2 in the axial direction that is the opposite side of the pen tip side is blocked.

As illustrated in FIG. 1, the opening portion 21 on the pen tip side of the housing 2 includes a pillar-shaped space with a predetermined length L in the axial direction, which is a center line direction of the pillar-shaped space, and the pillar-shaped space in the example is a columnar space having a circular cross section with the same diameter R1. An inner circumferential wall surface 21a of the opening 21 is exposed in the columnar space, and the columnar space communicates with the external space through an opening on the pen tip side.

A coil 3 for position detection, a pen pressure detector 4, and a printed board 6 provided with electronic parts, such as a capacitor 5 forming a resonant circuit along with the coil 3, are sequentially lined up from the pen tip side of the housing 2 in the axial direction and housed in an internal hollow portion 2a of the housing 2 of the electronic pen 1, the internal hollow portion 2a communicating with the columnar space of the opening portion 21.

The coil 3 is wound around a ferrite core 7 that is an example of a magnetic core. The ferrite core 7 provided with the coil 3 is housed near the opening portion 21 on the pen tip side of the housing 2. As illustrated in FIG. 1, a cushion member 71 is arranged at a tip of the ferrite core 7 on the pen tip side in the example.

A through hole 7a in the axial direction is provided on the ferrite core 7. A center line position of the through hole 7a of the ferrite core 7 coincides with a center line position of the opening portion 21 of the housing 2. A diameter R2 of the through hole 7a of the ferrite core 7 is smaller than the diameter R1 of the opening of the opening portion 21 of the housing 2. Note that cross sections of the housing 2, the coil 3, and the ferrite core 7 are illustrated in FIG. 1 for the convenience of description.

In the internal hollow portion 2a of the housing 2, the pen pressure detector 4 provided on the back end side of the ferrite core 7 includes a fitting portion 9 for fitting an axial portion 8S of a core body 8 described later. The fitting portion 9 of the pen pressure detector 4 is present on the extension of the through hole 7a of the ferrite core 7.

The pen pressure detector 4 in the example is a variable capacitor that detects the pressure (pen pressure) applied to a tip of the core body 8 as a change in capacitance. This type of pen pressure detector can be a well-known unit, such as a unit in which the capacitance changes when the contact area of a dielectric and a conductive elastic member changes according to the applied pressure (for example, see Japanese Patent Laid-Open No. 2016-126503) and a unit including a semiconductor device in which the distance between two electrodes facing each other through an air layer that is a dielectric changes according to the applied pressure (for example, see Japanese Patent Laid-Open No. 2013-161307). The pen pressure detector will not be described in detail here.

In the electronic pen 1 of the embodiment, the core body 8 of the embodiment configured as described below is inserted into the housing 2 through the columnar space of the opening portion 21. The core body 8 penetrates the through hole 7a of the ferrite core 7, and the core body 8 is fitted to and held by the fitting portion 9 provided on the pen pressure detector 4. When the core body 8 is fitted to the fitting portion 9 and installed on the electronic pen 1, a part of the core body 8 on one end side (pen tip side) in the axial direction protrudes outside from the opening on the pen tip side of the pillar-shaped space of the opening portion 21 of the housing 2 as illustrated in FIG. 1.
Embodiment of Core Body FIGS. 2A and 2B are diagrams for describing the core body 8 of the embodiment. FIG. 2A illustrates the core body 8 removed from the electronic pen 1, and FIG. 2B is a vertical cross-sectional view of the core body 8. The core body 8 in the example is a rod-shaped member with a circular shape in cross section. As illustrated in FIGS. 1 to 2B, a tip portion 8T on one end side of the core body 8 in the axial direction and the axial portion 8S extended toward another end side in the axial direction from the tip portion 8T are coupled and integrated in the core body 8.

The core body 8 of the embodiment includes the axial portion 8S and the tip portion 8T formed as one piece by felt 81 that is an example of a body containing fibers bundled in the axial direction as illustrated in FIG. 2B. The felt 81 is provided by bundling and bonding the fibers in the axial direction. In the embodiment, the felt 81 is particularly a felt material compressed and fixed in the axial direction to increase the strength of the bundle of fibers. In this way, the core body 8 including the tip portion 8T and the axial portion 8S can be provided as a molded product containing the felt 81.

In the core body 8 of the embodiment, the axial portion 8S containing the felt 81 is formed in a rod shape with a circular cross section having a diameter R3 smaller than the diameter R2 of the through hole 7a of the ferrite core 7 as illustrated in FIG. 2B.

A diameter R4 of the part of the tip portion 8T integrated with the axial portion 8S and containing the felt 81 is larger than the diameter R3 of the axial portion 8S (R4>R3) in the example. In this case, a tip of the felt 81 on the tip portion 8T side includes a protruding curved surface, such as a surface in a cannonball shape as illustrated in FIGS. 1 to 2B.

In the core body 8 of the embodiment, the entire part of the tip portion 8T with the diameter R4 is covered by a hard cover portion 82 containing a material, such as a hard resin, harder than the felt 81, except for the part of the protruding curved surface at the tip of the felt 81. In the example, the hard cover portion 82 contains POM as an example of the hard resin, and the hard cover portion 82 covers the felt 81 at a uniform thickness. Note that the hard material included in the hard cover portion 82 is not limited to the hard resin, and the hard material may be, for example, metal.

In this case, the part of the protruding curved surface at the tip of the tip portion 8T is not covered by the hard cover portion 82, and the felt 81 is exposed. The part of the protruding curved surface where the felt 81 is exposed is a contact portion 8Tc in the tip portion 8T of the core body 8 that comes into contact with an input surface of a position detection sensor. A length d (see FIGS. 2A and 2B) in the axial direction of the contact portion 8Tc of the protruding curved surface not covered by the hard cover portion 82 is a length sufficient as an amount of protrusion when the user brings the tip of the core body 8 of the electronic pen 1 into contact with the input surface of the position detection sensor to take a note.

In this way, the felt 81 is covered by the hard cover portion 82 except for the contact portion 8Tc in the tip portion 8T of the core body 8. Therefore, a diameter R5 of the part excluding the contact portion 8Tc is a size corresponding to the sum of the diameter R4 of the felt of the tip portion 8T and the thickness of the hard cover portion 82. The maximum diameter R5 of the tip portion 8T in the embodiment is selected to be a value a little smaller than the diameter R1 of the opening of the opening portion 21 in the housing 2 of the electronic pen 1 as illustrated in FIG. 1. That is, the maximum diameter R5 is selected such that a relation R1>R5>R4>R3 holds.

In the embodiment, a tapered portion 82t gradually becoming smaller from the outer diameter R5 to the diameter R4 is provided on the contact portion 8Tc side of the hard cover portion 82 to prevent a difference in level at the boundary of the contact portion 8Tc and the hard cover portion 82. Therefore, the electronic pen 1 of the embodiment has almost no difference in level at the boundary of the contact portion 8Tc and the hard cover portion 82 when the contact portion 8Tc of the core body 8 is brought into contact with the input surface of the position detection sensor to input writing. Owing to this configuration, there is an effect that the entire contact portion 8Tc with the length d can effectively be used as a portion that comes into contact with the input surface.

More specifically, when the angle between the axial direction of the electronic pen 1 and the input surface of the position detection sensor is not a right angle, that is, when the electronic pen 1 is used by tilting the electronic pen 1 with respect to the input surface of the position detection sensor, the felt 81 cannot come into contact with the input surface at the part of the contact portion 8Tc with the length d, the part corresponding to the size of the difference in level, if there is a difference in level at the boundary of the contact portion 8Tc and the hard cover portion 82. On the other hand, there is almost no difference in level at the boundary of the contact portion 8Tc and the hard cover portion 82 in the core body 8 of the embodiment, and the entire contact portion 8Tc with the length d can effectively be used as a contact portion.

The core body 8 configured in this way is inserted into the housing 2 from the axial portion 8S side through the opening portion 21 of the housing 2 of the electronic pen 1, and the axial portion 8S penetrates the through hole 7a of the ferrite core 7. An end portion of the axial portion 8S of the core body 8 is fitted to the fitting portion 9 provided on the pen pressure detector 4 to install the core body 8 on the electronic pen 1. The installed core body 8 can be pulled out while holding the part protruding outside from the opening portion 21 of the housing 2. That is, the core body 8 is removable and replaceable in the electronic pen 1 of the embodiment.

In the electronic pen 1 of the embodiment, the length of the core body 8 in the axial direction, the length of the ferrite core 7 in the axial direction, and the like are selected such that, when the end portion of the axial portion 8S is fitted to the fitting portion 9 to install the core body 8 on the electronic pen 1 in this way, the contact portion 8Tc and a part of the hard cover portion 82 protrude outside from the opening portion 21 of the housing 2, and a part of the rest of the hard cover portion 82 faces the inner circumferential wall surface 21a exposed to the columnar space of the opening portion 21 of the housing 2 in the tip portion 8T of the core body 8 as illustrated in FIG. 1.

That is, a part of the tip portion 8T of the core body 8 protrudes outside from the opening portion 21 of the housing 2 to form a pen tip, and a part of the rest of the tip portion 8T faces the inner circumferential wall surface 21a exposed to the columnar space of the opening portion 21 of the housing 2 in the electronic pen 1 of the embodiment as illustrated in FIG. 1. The part facing the inner circumferential wall surface 21a may be rubbed. Particularly, when, for example, the user holds the electronic pen 1 to perform a position indication operation on the input surface of the position detection sensor, the inner circumferential wall surface 21a of the opening portion 21 of the housing 2 and an outer circumferential surface of the tip portion 8T of the core body 8 may come into contact with each other and may be rubbed with each other if the electronic pen 1 is diagonal to the input surface.

However, the hard cover portion 82, instead of the felt 81, faces the inner circumferential wall surface 21a of the opening portion 21 of the housing 2 in the tip portion 8T of the core body 8 in the embodiment. Therefore, the part that comes into contact with the inner circumferential wall surface 21a of the opening portion 21 of the housing 2 is a part of the hard cover portion 82, and this prevents the inner circumferential wall surface 21a of the opening portion 21 of the housing 2 and the felt 81 from being rubbed with each other. This can prevent fluffing of the felt 81 at the part.

As described above, the maximum outer diameter R5 of the tip portion 8T of the core body 8 is smaller than the diameter R1 of the opening of the opening portion 21 in the housing 2 of the electronic pen 1, and a gap is formed between the outer circumferential surface of the hard cover portion 82 in the tip portion 8T of the core body 8 and the inner circumferential wall surface 21*a* of the opening portion 21 in the housing 2 of the electronic pen 1. However, the hard cover portion 82, instead of the felt 81, faces the inner circumferential wall surface 21*a* in the tip portion 8T of the core body 8 in the embodiment. Therefore, fluffing of the felt 81 does not have to be taken into account, and the gap can be selected to be as small as possible.

When the user of the electronic pen 1 presses the contact portion 8Tc of the core body 8 against the input surface of the position detection sensor and applies pen pressure, the core body 8 moves in the axial direction according to the size of the applied pen pressure and transmits the pen pressure to the pen pressure detector 4. When the pen pressure is applied to the tip of the core body 8, the inner circumferential wall surface 21*a* of the opening portion 21 of the housing 2 and the outer circumferential surface of the tip portion 8T of the core body 8 may come into contact with each other. However, the contact part is the part of the hard cover portion 82 of the tip portion 8T of the core body 8 in the electronic pen 1 of the embodiment. This can also prevent the inner circumferential wall surface 21*a* of the opening portion 21 of the housing 2 and the felt 81 from being rubbed with each other when the core body 8 moves in the axial direction, and this can prevent fluffing of the felt 81 at the part.

If the felt 81 is not covered by the hard cover portion 82 and becomes fluffy, the pen pressure value detected by the pen pressure detector 4 may be affected by the friction force at the inner circumferential wall surface 21*a* of the opening portion 21 caused by the fluffing. In contrast, the felt 81 is covered by the hard cover portion 82 in the tip portion 8T of the core body 8 in the embodiment. Therefore, the pen pressure value is not affected by the fluffing of the felt 81, and the pen pressure detector 4 can accurately detect the pen pressure applied to the tip of the core body 8.

As illustrated in FIG. 1, not only the tip portion 8T of the core body 8, but also a part of the axial portion 8S including a portion near the boundary with the tip portion 8T faces the inner circumferential wall surface 21*a* of the opening portion 21 of the housing 2 in the electronic pen 1 of the embodiment. However, the axial portion 8S of the core body 8 has a diameter smaller than the diameter R5 of the tip portion 8T in the embodiment, and the gap between the inner circumferential wall surface 21*a* of the opening portion 21 of the housing 2 and the part of the axial portion 8S facing the inner circumferential wall surface 21*a* is relatively large. Particularly, the diameter R4 at the tip portion 8T is selected to be larger than the diameter R3 at the axial portion 8S in the felt 81 of the embodiment, and the gap between the inner circumferential wall surface 21*a* of the opening portion 21 of the housing 2 and the part of the axial portion 8S facing the inner circumferential wall surface 21*a* is larger. Therefore, the part of the felt 81 of the axial portion 8S is rarely rubbed against the inner circumferential wall surface 21*a* of the opening portion 21 of the housing 2.

Effects of Embodiment

As described above, even when the gap between the tip portion of the core body and the inner circumferential wall surface of the opening portion of the housing is designed to be small in the electronic pen 1 with the core body 8 of the embodiment, the felt 81 of the tip portion 8T of the core body 8 is covered by the hard cover portion 82. Therefore, there is no rubbing between the felt 81 and the inner circumferential wall surface 21*a* of the opening portion 21 of the housing 2, and there is no fluffing at the part.

The tip portion 8T of the core body 8 includes the contact portion 8Tc not covered by the hard cover portion 82 in the embodiment. Therefore, the indicated position can precisely be input on the input surface of the position detection sensor through the contact portion 8Tc, and the usability of the electronic pen 1 is good.

The hard cover portion 82 prevents the rubbing between the inner circumferential wall surface 21*a* of the opening portion 21 of the housing 2 of the electronic pen 1 and the felt 81 of the core body 8 in the embodiment. Therefore, there is an effect that, even when the felt 81 is used as a material of the core body 8, the pen pressure detector 4 can suppress the influence of the fluffing of the felt to detect accurate pen pressure.

There is also an effect that the electronic pen 1 of the embodiment can reduce the value of what is generally called on-load, in which the pen pressure detector 4 detects the contact of the contact portion 8Tc of the core body 8 and the input surface of the position detection sensor to start to detect the pen pressure value, compared to that obtained when the felt 81 is exposed at the tip portion 8T.

In the embodiment, a material strengthened by compressing the felt material in the axial direction is used as the felt 81, and the part of the tip portion 8T and the axial portion 8S is formed as one piece of the felt 81. Therefore, there is an effect that the configuration of the core body 8 is simple, the core body 8 can be easily made, and the manufacturing cost is low as compared to the cases of Patent Document 1 and Patent Document 2.

Other Embodiments or Modifications of Core Body

In the core body 8 of the embodiment, the diameter of the felt 81 at the tip portion 8T and the diameter of the felt 81 at the axial portion 8S are different. However, the diameter of felt 81A at a tip portion 8AT and the diameter of the felt 81A at an axial portion 8AS may be the same as in a core body 8A of an example illustrated in FIG. 3A. In the core body 8A of the example, the tip portion 8AT of the felt 81A is also covered by a hard cover portion 82A except for a contact portion 8ATc. The contact portion 8ATc side of the hard cover portion 82A is also a tapered portion 82At in the example.

In addition, the felt 81 of the axial portion 8S is left exposed in the core body 8 of the embodiment. However, an axial portion 8BS may also be covered by a hard cover portion 83 as in a core body 8B of an example illustrated in FIG. 3B. In the core body 8B of the example, a tip portion 8BT of felt 81B is also covered by a hard cover portion 82B except for a contact portion 8BTc as in the core body 8 of the embodiment. The contact portion 8BTc side of the hard cover portion 82B is also a tapered portion 82Bt in the example.

The hard cover portion 83 covering the axial portion 8BS in the core body 8B of the example of FIG. 3B may contain the same hard material as the hard cover portion 82B covering the tip portion 8BT or may contain a different type of hard material. Note that the maximum diameter of the tip portion 8BT is also larger than the diameter of the axial portion 8BS covered by the hard cover portion 83 in the core body 8B of the example of FIG. 3B.

According to the core body 8B of the example, the axial portion 8BS is also covered by the hard cover portion 83, and fluffing of the felt 81B at the axial portion 8BS can also be prevented.

Both the tip portion 8T and the axial portion 8S are provided as a molded product of the felt 81 in the core body

8 of the embodiment. However, the axial portion may be a part separate from the core body portion as in a core body 8C of an example of FIG. 3C.

That is, the core body 8C in the example of FIG. 3C includes an axial portion 8CS including a pipe 84 containing a hard material, such as metal, and a tip portion 8CT is attached to the pipe 84. The tip portion 8CT of the example is covered by a hard cover portion 82C except for a contact portion 8CTc at the tip of felt 81C in, for example, a cannonball shape as in the core body 8 of the example described above. The contact portion 8CTc side of the hard cover portion 82C is also a tapered portion 82Ct in this example.

The felt 81C included in the tip portion 8CT of the example includes a fitting portion 81Ca inserted into a hollow portion 84a of the pipe 84 to fit and fix the tip portion 8CT to the pipe 84 as illustrated in FIG. 3C. In this case, the fitting portion 81Ca fitted and inserted into the hollow portion 84a of the pipe 84 may be bonded by an adhesive for firmer fixation.

Note that, in the example, a predetermined member 85 is fitted to block the back end side of the hollow portion 84a of the pipe 84 of the axial portion 8CS. The predetermined member 85 may contain felt or may contain another material. The back end side of the hollow portion 84a of the pipe 84 of the axial portion 8CS may not be blocked and may be left open.

In the core body 8C of the example, the axial portion 8CS does not contain felt, and the strength of the core body can further be increased.

Other Embodiments of Electronic Pen

First Other Embodiment

In recent years, a cartridge-type electronic pen is becoming more popular due to the diversification (emphasis on design) in the overall shape (outer housing). To realize this, an electronic pen is proposed in which an electronic pen body portion having main functions of the electronic pen, such as a position indication function for a position detection sensor and a pen pressure detection function, is provided as a cartridge. This type of electronic pen can be provided just by housing and incorporating the electronic pen body portion provided as a cartridge into a hollow portion of a tubular outer housing. This increases the degree of freedom in design of the housing of the electronic pen and facilitates the diversification of the electronic pen. The electronic pen body portion can easily be replaced like a refill of a ballpoint pen, and this is very convenient. A knock-type electronic pen can also be provided, in which a knock system is used to push in and out the cartridge-type electronic pen body portion as in a knock-type ballpoint pen.

FIGS. 4A to 4C depict a configuration example of the embodiment of an electronic pen 1A according to a first other embodiment of the disclosure, and the electronic pen body portion is housed as an electronic pen cartridge 30 in a housing 2A. In the embodiment, the electronic pen cartridge 30 can be attached to and detached from the housing 2A. The example illustrates a case of an electronic pen of electromagnetic resonance system.

The electronic pen 1A of the embodiment has a knock-type configuration as illustrated in FIGS. 4A and 4B, in which the electronic pen cartridge 30 is housed in a hollow portion 2Aa of the tubular housing 2A (hereinafter, referred to as a pen housing 2A in the description of the embodiment), and a knock cam mechanism portion 40 puts in and out the pen tip side of the electronic pen cartridge 30 from an opening portion 21A on one end side of the pen housing 2A in the axial direction.

FIG. 4A illustrates a state in which the entire electronic pen cartridge 30 is housed in the hollow portion 2Aa of the pen housing 2A, and FIG. 4B illustrates a state in which the knock cam mechanism portion 40 pushes out the pen tip side of the electronic pen cartridge 30 from the opening portion 21A of the pen housing 2A. Note that, in the example of FIGS. 4A to 4C, the pen housing 2A of the electronic pen 1A contains a transparent synthetic resin, and the inside of the pen housing 2A can be seen through.

The pen housing 2A and the knock cam mechanism portion 40 provided in the pen housing 2A have the same configurations as the outer housing and the knock cam function of a well-known commercially-available knock-type ballpoint pen in which a cam body 41, a knock rod 42, and a rotor 43 are combined as illustrated in FIGS. 4A to 4C. The cam body 41 is formed on an inner wall surface of the tubular pen housing 2A. An end portion 42a of the knock rod 42 protrudes from an opening 2Ab of the pen housing 2A on the opposite side of the pen tip side such that the knock rod 42 can receive a knock operation of the user. The rotor 43 includes a fitting portion 43a to which an end portion of the electronic pen cartridge 30 on the opposite side of the pen tip side is removably fitted.

When the end portion 42a of the knock rod 42 is pressed in the state of FIG. 4A, the knock cam mechanism portion 40 locks the electronic pen cartridge 30 in the pen housing 2A in the state of FIG. 4B, and the pen tip side of the electronic pen cartridge 30 protrudes from the opening portion 21A of the pen housing 2A. When the end portion 42a of the knock rod 42 is pressed again from the state of FIG. 4B, the knock cam mechanism portion 40 releases the locked state, and a return spring 45 returns the position of the electronic pen cartridge 30 in the pen housing 2A to the state of FIG. 4A. The detailed configuration and the action of the knock cam mechanism portion 40 are well-known, and they will not be described here.

Configuration Example of Electronic Pen Cartridge 30

FIG. 4C depicts a configuration example of the electronic pen cartridge 30 according to the embodiment. The electronic pen cartridge 30 of the example includes a signal transmission member 31 and a cartridge housing portion 32 that holds a pen pressure detector and that houses a printed board provided with electronic circuits as illustrated in FIG. 4C.

The signal transmission member 31 includes a coil 311 included in a resonant circuit that uses the electromagnetic resonance system to transmit and receive signals to and from the position detection sensor, and a magnetic core, which is a ferrite core 312 in the example, around which the coil 311 is wound. A through hole 312a is formed at the center position of the ferrite core 312 in the axial direction.

The cartridge housing portion 32 contains, for example, a resin material and is fitted to the ferrite core 312 of the signal transmission member 31. The cartridge housing portion 32 holds a pen pressure detector 4A and holds a printed board (not illustrated). A capacitor included in the resonant circuit along with the coil 311 is arranged on the printed board.

In the example, the core body 8 of the embodiment described with reference to, for example, FIGS. 1 to 2B is inserted into the through hole 312a of the ferrite core 312 and fitted to a fitting portion 9A of the pen pressure detector 4A, and the core body 8 is removably installed on the electronic pen cartridge 30. In this way, the pressure (pen pressure) applied to the contact portion 8Tc at the tip of the core body 8 on the pen tip side is applied to the pen pressure detector 4A.

The pen pressure detector 4A used in the example includes a variable capacitor that is a semiconductor chip including a micro electro mechanical systems (MEMS) element (for example, see Japanese Patent Laid-Open No. 2013-161307). Note that, as with the pen pressure detector 4, the pen pressure detector 4A may have a configuration in which the capacitance changes when the contact area of the dielectric and the conductive elastic member changes according to the applied pressure (for example, see Japanese Patent Laid-Open No. 2016-126503).

Note that, in the embodiment, the signal transmission member 31 and the cartridge housing portion 32 are coupled in the axial direction as described above, and the electronic pen cartridge 30 has a configuration of a cartridge with the same external shape as a refill of a ballpoint pen.

In the electronic pen 1A of the embodiment, the user pushes the knock rod 42, and the knock cam mechanism portion 40 pushes out the pen tip side of the electronic pen cartridge 30 from the opening portion 21A of the pen housing 2A. In this state, the length of the core body 8 in the axial direction, the length of the ferrite core 312 in the axial direction, the size of the knock stroke of the knock cam mechanism portion 40, and the like are selected such that the contact portion 8Tc and a part of the hard cover portion 82 in the tip portion 8T of the core body 8 protrude outside from the opening portion 21A of the pen housing 2A and a part of the rest of the hard cover portion 82 faces an inner circumferential wall surface 21Aa forming the columnar space of the opening portion 21A of the housing 2A as illustrated in FIG. 4B.

Therefore, when the user uses the electronic pen 1A to input writing on the input surface of the position detection sensor while the part of the tip portion 8T of the core body 8 illustrated in FIG. 4B protrudes outside, the felt 81 of the tip portion 8T of the core body 8 is covered by the hard cover portion 82 as in the embodiment described above. As a result, there is no rubbing between the felt 81 and the inner circumferential wall surface 21*a* of the opening portion 21 of the housing 2, and fluffing of the felt 81 can be prevented.

In the electronic pen 1A of the embodiment of FIGS. 4A to 4C, the felt 81 of the tip portion 8T is also covered by the hard cover portion 82 when the knock system is used to move the electronic pen cartridge 30 in the axial direction to push in and out the tip portion 8T of the core body 8 installed on the electronic pen cartridge 30. Therefore, there is no rubbing between the felt 81 and the inner circumferential wall surface 21*a* of the opening portion 21 of the housing 2, and fluffing of the felt 81 can be prevented.

Note that it is obvious that the core body installed on the electronic pen cartridge 30 is not limited to the core body 8 of the example described above, and the core body may be one of the core bodies 8A, 8B, and 8C of the other examples illustrated in FIGS. 3A to 3C and core bodies of other modifications.

In addition, the core body 8 can be attached to and detached from the electronic pen cartridge 30 in the examples of FIGS. 4A to 4C. However, the core body may be installed and fixed to the electronic pen cartridge.

FIGS. 5A and 5B are diagrams for describing an electronic pen cartridge 30D in an example in which the core body is installed and fixed. Note that, although not illustrated in FIGS. 5A and 5B, the electronic pen cartridge 30D of the example, in place of the electronic pen cartridge 30 of the example described above, can be housed in the pen housing 2A and used as the electronic pen 1A.

As illustrated in FIGS. 5A and 5B, a signal transmission member 31D includes the coil 311 and a ferrite core 312D in the example. The ferrite core 312D does not include the through hole in the axial direction in the example, but instead, the ferrite core 312D includes a fitting recess portion 312Da on the pen tip side.

In the example, a core body 8D does not include the axial portion, but includes only a tip portion 8DT. The tip portion 8DT of the core body 8D includes, on the back end side of the felt 81D, a fitting protruding portion 8DTa fitted to the fitting recess portion 312Da of the ferrite core 312D. The fitting protruding portion 8DTa protruding on the back end side of the tip portion 8DT is fitted to the fitting recess portion 312Da of the ferrite core 312D, and they are attached by, for example, bonding. In this way, the tip portion 8BT of the core body 8D is installed and fixed to the pen tip side of the ferrite core 312D.

The tip portion 8DT of the core body 8D in the example also includes a contact portion 8DTc where the felt 81D is exposed and includes a part covered by a hard cover portion 82D as in the embodiment.

The user pushes the knock rod 42, and the knock cam mechanism portion 40 pushes out the pen tip side of the electronic pen cartridge 30D from the opening portion 21A of the pen housing 2A. In this state, as in the case illustrated in FIG. 4B, the contact portion 8DTc and a part of the hard cover portion 82D in the tip portion 8DT of the core body 8D protrude outside from the opening portion 21A of the pen housing 2A, and a part of the rest of the hard cover portion 82D faces the inner circumferential wall surface 21Aa exposed to the columnar space of the opening portion 21A of the housing 2A.

Note that the core body 8D is fixed to the ferrite core 312D in the electronic pen cartridge 30D of the example. Therefore, the electronic pen cartridge 30D is configured as follows to detect the pen pressure applied to the contact portion 8DTc of the core body 8D.

The cartridge housing portion 32 in the example includes a first tubular body portion 321 provided with electronic circuit parts and a second tubular body portion 322 provided with pen pressure detection parts. As illustrated in FIG. 5B, a printed board 33 is arranged in the first tubular body portion 321, and a circuit part 34 including a capacitor that forms a resonant circuit along with the coil 311 is provided on the printed board 33. In the first tubular body portion 321, a winding start part 311*a* and a winding end part 311*b* of the coil 311 are electrically connected to one end and another end of the capacitor as illustrated in FIG. 4B.

In the example, the second tubular body portion 322 is divided into two parts including a long portion 322*a* and a short portion 322*b*, and a pen pressure detector 36 is provided near a coupling portion 35 of the long portion 322*a* and the short portion 322*b*. That is, as illustrated in FIG. 5B, the long portion 322*a* and the short portion 322*b* in the example are coupled through a connection rod member 351 and a coil spring 352 at the coupling portion 35. In this case, the long portion 322*a* and the short portion 322*b* are always elastically displaced away from each other in the axial direction by the coil spring 352. However, the connection rod member 351 locks the long portion 322*a* and the short portion 322*b* at predetermined positions to prevent them from being displaced more than that in the axial direction.

As illustrated in FIG. 5B, the pen pressure detector 36 is provided on the long portion 322*a* in the embodiment. One end 351a side of the connection rod member 351 functions as a pressing portion of the pen pressure detector 36.

The pen pressure detector 36 of the example also includes a variable capacitor in which the capacitance changes according to the pen pressure, the variable capacitor including pen pressure detection means with a well-known configuration described, for example, in Japanese Patent Laid-Open Nos. 2011-186803 and 2013-161307, as with the pen pressure detector described above. In the embodiment, the variable capacitor is connected in parallel to the resonant circuit including the coil 311 and the capacitor described above.

When the pressure is applied to the contact portion 8DTc of the core body 8D while the electronic pen cartridge 30D is housed in the pen housing of the electronic pen, force for moving the entire long portion 322a side of the electronic pen cartridge 30D toward the short portion 322b is generated against the elastic force of the coil spring 352, and the capacitance of the pen pressure detector 36 corresponds to the pen pressure. As a result, the resonant frequency of the resonant circuit is changed by the capacitance corresponding to the pen pressure that is detected by the pen pressure detector 36 and that is applied to the contact portion 8DTc of the core body 8D, and the pen pressure value as a change in resonant frequency is transmitted to the position detection sensor side.

When the electronic pen cartridge 30D of the example is used, effects similar to the effects of the electronic pen 1A with the electronic pen cartridge 30 in the example of FIGS. 4A to 4C can also be obtained.

Second Another Embodiment

The electronic pen includes a combination of fine parts. Therefore, the amount of protrusion of the tip portion of the core body from the opening of the housing is changed when tolerances of individual parts are stacked up. The amount of protrusion of the tip portion of the core body from the opening of the housing may be changed not only by the tolerances of the parts, but also by the use of the electronic pen.

In this way, the amount of protrusion of the tip portion 8T of the core body 8 from the opening at the tip of the columnar space of the opening portion 21 in the housing 2 of the electronic pen 1 may be increased by the tolerances of the parts or the like, and the position of the coupling portion of the tip portion 8T and the axial portion 8S of the core body 8 may approach the opening side on the tip side of the columnar space of the opening portion 21 in the housing 2 of the electronic pen 1 as indicated by a dotted line in FIG. 6. In this case, the core body 8 may be bent near the boundary of the tip portion 8T and the axial portion 8S when the user tilts the electronic pen 1 diagonally to the input surface and applies pen pressure.

Figure 7:
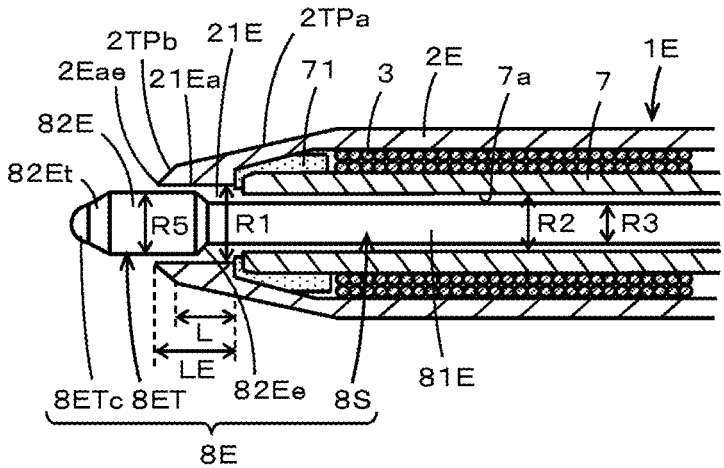
FIG. 7 is a diagram for describing a configuration example of the second another embodiment of the electronic pen according to the disclosure.
Figure 8:
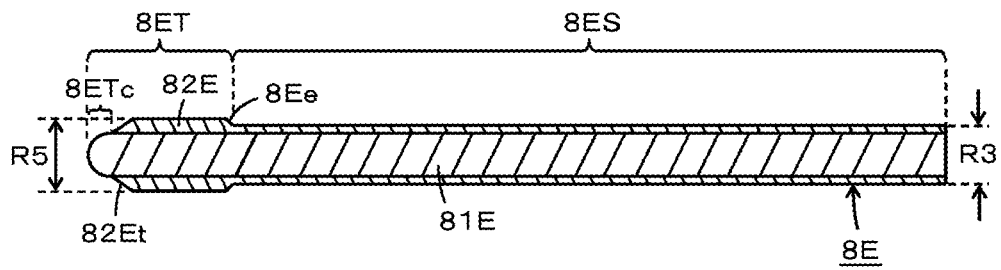
FIG. 8 is a diagram for describing a configuration example of an electronic pen core body used in the second another embodiment of the electronic pen according to the disclosure.

An electronic pen of a second another embodiment is an example that can solve the problem, and the electronic pen is characterized by the configuration of the pen tip side of the housing. FIG. 7 depicts the pen tip side of an electronic pen 1E of the second another embodiment, and the same reference signs are provided to the same parts as the electronic pen 1 described with reference to FIG. 1. FIG. 8 is a cross-sectional view for describing a configuration example of a core body 8E used in the electronic pen 1E of the second another embodiment.

The configuration of the pen tip side of a housing 2E in the electronic pen 1E of this embodiment is different from that of the housing 2 of the electronic pen 1 in the embodiment described above.

A tapered portion 2TPa gradually becoming thinner toward the opening of the opening portion 21 is formed on the pen tip side of the housing 2 of the electronic pen 1 of the embodiment described above as illustrated in FIG. 6, and the tip side of the tapered portion 2TPa is a planar ring-shaped end surface 2R in a direction orthogonal to the axial direction. That is, an inner circumferential edge (circular edge in the example) 21ae at the opening of the opening portion 21 on the pen tip side in the inner circumferential wall surface 21a exposed in the columnar space of the opening portion 21 of the housing 2 is an inner circumferential edge of the planar ring-shaped end surface 2R in the direction orthogonal to the axial direction at the tip of the housing 2 on the pen tip side.

In contrast, a tapered portion 2TPb gradually becoming thinner (the diameter gradually decreases in the example) toward an inner circumferential edge 21Eae at the opening of an opening portion 21E on the pen tip side in the inner circumferential wall surface 21Ea exposed in the columnar space of the opening portion 21E is formed at the tip of the housing 2E on the pen tip side in the electronic pen 1E of this embodiment as illustrated in FIG. 7. That is, the planar ring-shaped end surface 2R in the direction orthogonal to the axial direction as illustrated in FIG. 6 is not formed at the tip of the housing 2E on the pen tip side in the electronic pen 1E of this embodiment, but instead, the tapered portion 2TPb (second tapered portion) formed toward the inner circumferential edge 21ac at the opening of the opening portion 21E on the pen tip side is formed closer to the pen tip continuously from the tapered portion 2TPa (first tapered portion).

Therefore, as illustrated in FIG. 7, the length in the axial direction of the columnar space of the opening portion 21E of the housing 2E on the pen tip side in the electronic pen 1E of this embodiment is LE that is the sum of the length of the tapered portion 2TPb and the length L in the electronic pen 1 of the example of FIG. 1. In this case, the tilt angle of the tapered portion 2TPb (second tapered portion) with respect to the axial direction is larger than the tilt angle of the tapered portion 2TPa (first tapered portion) with respect to the axial direction in the example as illustrated in FIG. 7.

Note that the tilt angle of the tapered portion 2TPb with respect to the axial direction may not be larger than the tilt angle of the tapered portion 2TPa with respect to the axial direction. The tilt angle of the tapered portion 2TPb with respect to the axial direction may be smaller than the tilt angle of the tapered portion 2TPa with respect to the axial direction, or the tilt angle of the tapered portion 2TPa with respect to the axial direction may be equal to the tilt angle of the tapered portion 2TPb with respect to the axial direction. Although the tapered portion 2TPb is formed smoothly and continuously without a difference in level from the tapered portion 2TPa in the example of FIG. 7, there may be a difference in level, or the tapered portion 2TPa and the tapered portion 2TPb may be formed continuously, but not smoothly.

The core body 8E for the electronic pen 1E of this embodiment is configured as illustrated in FIG. 8. That is, the entire columnar rod-shaped member of felt 81E with a diameter slightly smaller than the diameter R3 of an axial portion 8ES in the core body 8E of the example is covered by a hard cover portion 82E, except for a contact portion 8ETc of a cannonball-shaped curved protruding portion on the pen tip side of the felt 81E of the rod-shaped member.

In this case, a tip portion 8ET of the core body 8E includes a part where the felt 81E is covered by the hard cover portion 82E such that the maximum diameter becomes R5 except for the contact portion 8ETc, and a tapered portion 82Et formed from the pen tip side of the part of the hard cover portion 82E with the diameter R5 toward the contact portion 8ETc. The tip portion 8ET in this example further includes a tapered portion 82Ee with a diameter gradually becoming smaller toward the axial portion 8ES from the opposite side of the pen tip side of the part of the hard cover portion 82E with the diameter R5. The length of the tip portion 8ET of the core body 8E in the axial direction of this example is longer than the tip portion 8T of the core body 8 in the example of FIG. 1 since the tip portion 8ET includes the tapered portion 82Ee with the diameter gradually becoming smaller toward the axial portion 8ES from the opposite side of the pen tip side of the part of the hard cover portion 82E with the diameter R5.

According to the electronic pen 1E of this embodiment configured in this way, the tapered portion 2TPa formed toward the inner circumferential edge 21ae at the opening of the opening portion 21E on the pen tip side is formed on the pen tip side of the housing 2E, and the length LE in the axial direction of the columnar space of the opening portion 21E is longer than the length L in the axial direction of the columnar space of the opening portion 21 of the housing 2 in the electronic pen 1 of the example of FIG. 1.

This can prevent the boundary of the tip portion 8ET and the axial portion 8ES of the core body 8E from approaching the opening side on the tip side of the columnar space in the opening portion 21 of the housing 2 of the electronic pen 1 even if the amount of protrusion of the tip portion 8T of the core body 8 from the opening at the tip of the columnar space in the opening portion 21 of the housing 2 of the electronic pen 1 is increased by the tolerances of parts or the like. This can improve the problem that the core body 8E is bent near the boundary of the tip portion 8ET and the axial portion 8ES.

Moreover, the boundary of the tip portion 8ET and the axial portion 8ES is not a step portion with a vertical wall, but the core body 8E of this embodiment includes the tapered portion 82Ee with the diameter gradually becoming smaller toward the axial portion 8ES from the opposite side of the pen tip side at the part of the hard cover portion 82E with the maximum diameter R5 in the tip portion 8ET. Therefore, the length of the tip portion 8ET in the axial direction is substantially larger than the tip portion 8T of the core body 8, and the tapered portion 82Ee can make the core body 8E more difficult to bend.

Although the tip portion 8ET and the axial portion 8ES are covered by the hard cover portion 82E except for the contact portion 8ETc in the core body 8E of the electronic pen 1E of the second another embodiment described above, the configuration is not limited to this, and the core body 8E may have a configuration similar to that of the core body 8, 8A, 8B, or 8C.

Note that the configuration of the electronic pen 1E and the core body 8E of the second another embodiment described above can also be applied to an electronic pen with a core body containing a material other than felt and to the core body, and the bend of the core body can be prevented. For example, the effect of preventing the bend of the core body can also be expected when, for example, elastomer, instead of the felt 81E, is used for the core body 8E in the example of FIG. 8, and POM is used for the hard cover portion 82E.

OTHER EMBODIMENTS OR MODIFICATIONS

Although the electromagnetic resonance system is adopted in all of the electronic pens in the examples described in the embodiments, the electronic pen and the electronic pen core body according to the disclosure can also be applied to an electronic pen and an electronic pen core body of capacitance system, particularly, active capacitance system. However, the felt included in the core body is conductive in the electronic pen and the electronic pen core body of capacitance system.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen comprising:
a housing including an opening portion on a pen tip side of the housing on a first end in an axial direction of the housing,
wherein the opening portion has a pillar-shaped space with a predetermined length in the axial direction of the housing,
wherein the axial direction of the housing is a center line direction of the pillar-shaped space, and
wherein a hollow portion inside of the housing communicates with the pillar-shaped space of the opening portion;
a pen pressure detector arranged in the hollow portion of the housing; and
a core body including a tip portion on the first end in the axial direction of the housing, and an axial portion that extends from the tip portion toward a second end in the axial direction of the housing that is opposite the first end,
wherein part of the tip portion, in operation, protrudes outside of the housing from an opening on a pen tip side of the pillar-shaped space of the opening portion of the housing,
wherein the core body is installed such that the second end in the axial direction of the housing, in operation, transmits, to the pen pressure detector arranged in the hollow portion of the housing, pen pressure applied to the tip portion, wherein the tip portion of the core body contains fibers bundled in the axial direction of the housing, wherein the fibers bundled in the axial direction of the housing are exposed at a contact portion that, in operation, comes into contact with an input surface of a position detection sensor, wherein at least part of the tip portion of the core body that faces an inner circumferential wall surface of the opening portion on the pen tip side of the housing is covered by a material harder than the fibers bundled in the axial direction of the housing, and wherein the axial portion of the core body is not covered by the material harder than the fibers bundled in the axial direction of the housing.

2. The electronic pen according to claim 1, wherein the axial portion is directly fitted to, or indirectly fitted through a pen pressure transmission member to, the pen pressure detector arranged in the hollow portion of the housing.

3. The electronic pen according to claim 2, wherein the fibers bundled in the axial direction of the housing are felt.

4. The electronic pen according to claim 3, wherein the axial portion contains felt integrated with the felt included in the tip portion, and the felt of the axial portion and the felt included in the tip portion are obtained by compressing and fixing a felt material in the axial direction of the housing.

5. The electronic pen according to claim 2, wherein the tip portion of the core body is thicker than the axial portion.

6. The electronic pen according to claim 2, wherein the axial portion of the core body is configured to be inserted into a through hole of a magnetic core around which a coil is wound, and an end portion of the axial portion of the core body inserted into the through hole of the magnetic core is directly fitted to, or indirectly fitted through the pen pressure transmission member to, the pen pressure detector.

7. The electronic pen according to claim 1, wherein a thickness of a material at the at least part of the tip portion of the core body covered by the material harder than the fibers bundled in the axial direction of the housing is a predetermined thickness, and a pen tip side of the at least part of the tip portion of the core body becomes thinner toward the contact portion.

8. The electronic pen according to claim 1, wherein the pen tip side of the housing is a tapered portion that becomes narrower toward an inner circumferential edge of the opening on the pen tip side of the pillar-shaped space of the opening portion.

9. The electronic pen according to claim 8, wherein the tapered portion includes a first tapered portion that becomes thinner from a maximum diameter of the housing and a second tapered portion that becomes thinner than the first tapered portion on the pen tip side of the housing.

10. The electronic pen according to claim 9, wherein a tilt angle of the second tapered portion with respect to the axial direction of the housing is larger than a tilt angle of the first tapered portion with respect to the axial direction of the housing.

11. An electronic pen core body comprising:

a tip portion on a first end in an axial direction of the electronic pen core body; and an axial portion that extends from the tip portion toward a second end in the axial direction of the electronic pen core body that is opposite the first end, wherein part of the tip portion, in operation, protrudes outside of the electronic pen core body from an opening portion on a pen tip side of a housing of an electronic pen, wherein the electronic pen core body is installed such that the second end in the axial direction of the electronic pen core body, in operation, transmits, to a pen pressure detector arranged in a hollow portion of the housing, pen pressure applied to the tip portion, wherein the tip portion contains fibers bundled in the axial direction of the electronic pen core body, wherein the fibers bundled in the axial direction of the electronic pen core body are exposed at a contact portion that, in operation, comes into contact with an input surface of a position detection sensor, wherein at least part of the tip portion faces an inner circumferential wall surface of the opening portion on the pen tip side of the housing is covered by a material harder than the fibers bundled in the axial direction of the electronic pen core body, and wherein the axial portion is not covered by the material harder than the fibers bundled in the axial direction of the electronic pen core body.

12. The electronic pen core body according to claim 11, wherein the axial portion is directly fitted to, or indirectly fitted through a pen pressure transmission member to, the pen pressure detector arranged in the hollow portion of the housing.

13. The electronic pen core body according to claim 12, wherein the fibers bundled in the axial direction of the electronic pen core body are felt.

14. The electronic pen core body according to claim 13, wherein the axial portion contains felt integrated with the felt included in the tip portion, and the felt of the axial portion and the felt included in the tip portion are obtained by compressing and fixing a felt material in the axial direction of the electronic pen core body.

15. The electronic pen core body according to claim 12, wherein the tip portion is thicker than the axial portion.

16. The electronic pen core body according to claim 12, wherein a tapered portion that becomes thicker from the axial portion toward the tip portion is formed at a boundary of the tip portion and the axial portion.

* * * * *